US007420165B1

(12) United States Patent
Pop et al.

(10) Patent No.: US 7,420,165 B1
(45) Date of Patent: Sep. 2, 2008

(54) METHOD OF DETERMINING THE POWER TRANSFER OF NUCLEAR COMPONENT WITH A LAYER OF MATERIAL PLACED UPON A HEATING SURFACE OF THE COMPONENT

(75) Inventors: Mihai G. M. Pop, Lynchburg, VA (US); John Carroll Griffith, Lynchburg, VA (US); William Edward Allmon, Lynchburg, VA (US); Brian Glenn Lockamon, Evington, VA (US)

(73) Assignee: Areva NP, Inc., Lynchburg, VA (US)

( * ) Notice: Subject to any disclaimer, the term of this patent is extended or adjusted under 35 U.S.C. 154(b) by 285 days.

(21) Appl. No.: 11/450,702

(22) Filed: Jun. 9, 2006

(51) Int. Cl.
*G01N 23/225* (2006.01)
*G01K 17/00* (2006.01)
*G21C 17/00* (2006.01)

(52) U.S. Cl. .......................... 250/307; 376/245; 374/29

(58) Field of Classification Search .................. None
See application file for complete search history.

(56) References Cited

U.S. PATENT DOCUMENTS

| 5,046,289 | A | 9/1991 | Bengel et al. |
| 5,659,248 | A | 8/1997 | Hedengren et al. |
| 6,037,768 | A | 3/2000 | Moulder et al. |
| 6,366,083 | B1 | 4/2002 | McClelland |
| 6,369,566 | B1 | 4/2002 | McClelland |
| 6,466,637 | B2 | 10/2002 | Bowen et al. |
| 6,932,949 | B2 | 8/2005 | Benz et al. |
| 7,058,154 | B1 | 6/2006 | Stark et al. |
| 7,132,651 | B2 | 11/2006 | Pop et al. |
| 7,304,301 | B1 * | 12/2007 | Pop et al. ..................... 250/307 |

OTHER PUBLICATIONS

Blondel et al., "Modelling of solute concentration into crud deposits uder subcooled boiling conditions", Excerpt of the COMSOL Multiphysics User's Conference, 2005, Paris, cds.comsol.com/access/dl/papers/1222/Blondel.pdf.*
Henshaw et al., "A model of chemistry and thermal hydraulics in PWR fuel crud deposits", Journal of Nuclear Materials, 353 (2006) pp. 1-11.*

* cited by examiner

*Primary Examiner*—Jack I Berman
(74) *Attorney, Agent, or Firm*—Kenyon & Kenyon LLP

(57) ABSTRACT

A method to characterize the power transfer of a nuclear component is provided including the steps of obtaining a sample of a deposit layer on a side of a nuclear component, obtaining a scanning electron microscope image of an outside surface of the sample, obtaining a scanning electron microscope image of an inside surface of the sample, analyzing the scanning electron microscope images of the outside and inside surfaces of the sample for a presence of capillaries and steam chimneys, and calculating the power transfer of the component based on a number of steam chimneys in the deposit layer.

18 Claims, 1 Drawing Sheet

Chimneys and Capillaries Size Distribution in Crud

Figure 1. Chimneys and Capillaries Size Distribution in Crud
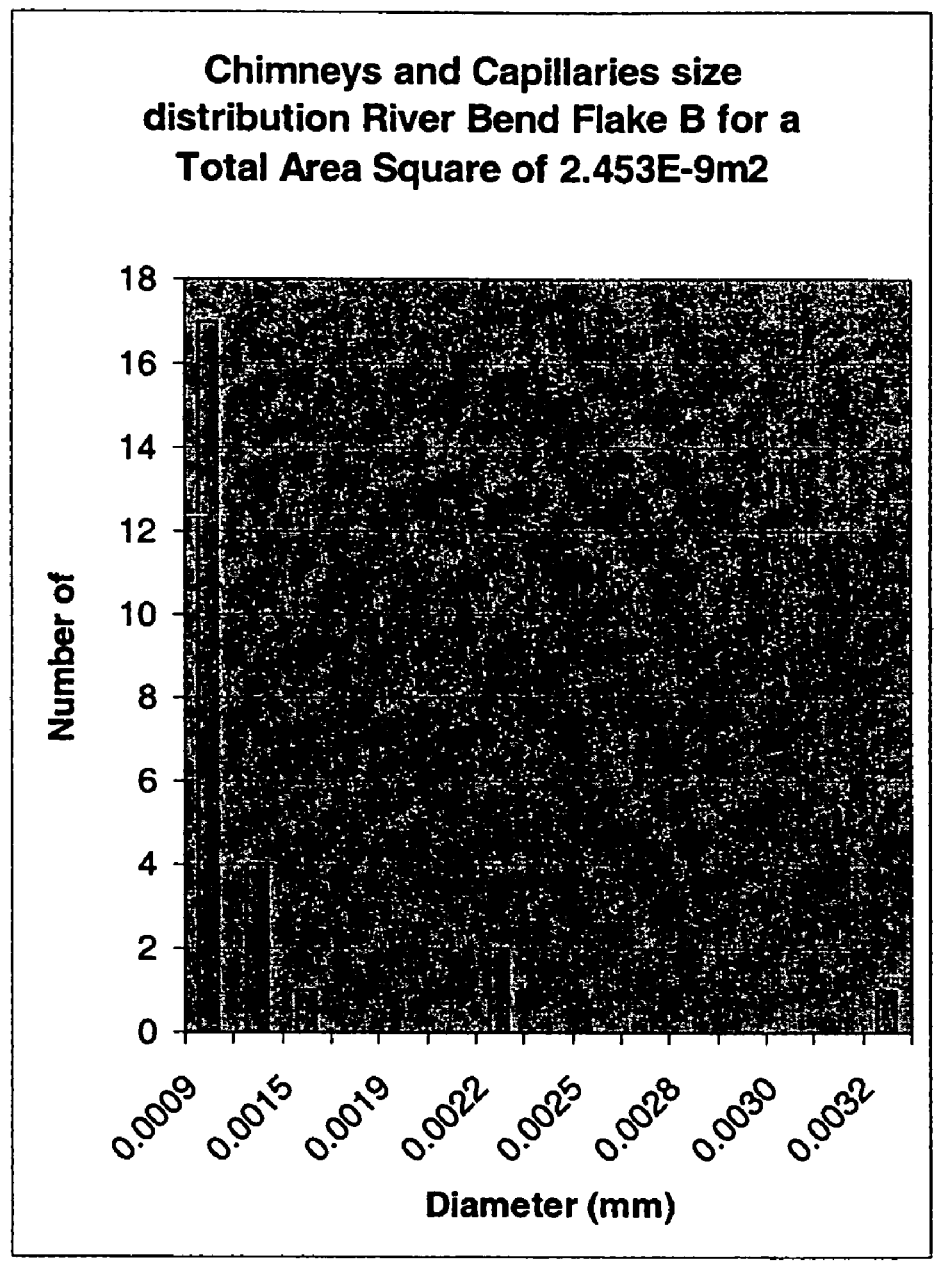

METHOD OF DETERMINING THE POWER TRANSFER OF NUCLEAR COMPONENT WITH A LAYER OF MATERIAL PLACED UPON A HEATING SURFACE OF THE COMPONENT

FIELD OF THE INVENTION

The present invention relates to a process for measuring a power output of a nuclear component that has coatings and/or materials accumulated upon the heat transfer surfaces obtained from deposition of materials in liquid coolants on those surfaces. More specifically, the present invention provides a method to measure power transfer characteristics through Chalk River Unidentified Deposits (CRUD) deposited on components, for example fuel rods of a light water reactor fuel assembly.

BACKGROUND INFORMATION

Measurement of power output of a nuclear fuel assembly is a critical task undertaken periodically at nuclear power plants throughout the world. Power output of fuel assemblies is measured on a spot and continual basis to ensure that the nuclear reactor core is behaving as expected and designed with various methods, usually in-core detectors monitoring specific characteristics of nuclear radiation. Furthermore, nuclear power operators are specifically required to operate the nuclear reactor within certain performance limits to guarantee reactor and component safety. If unexpected transients occur and regions of the nuclear reactor core are undergoing unanticipated levels of nuclear activity, the fuel assemblies (rods) in that specific region may become depleted too quickly rendering that area of the nuclear core less viable for continued operation. As a result of the depleted fuel assemblies, the fuel assemblies in this region will have to undergo remedial measures to minimize the unexpected depletion. The depleted fuel assemblies may be replaced with fresh fuel assemblies and the core reshuffled (i.e. the fuel assemblies moved to different positions in the core). In other instances, local power of fuel assemblies may be less than designed due to the depleted assemblies, thereby requiring control rods to be withdrawn or, alternatively, chemical shims removed from the coolant to increase reactivity in the core. Operating a nuclear reactor in an underpowered or overpowered mode negatively impacts the economics of the facility.

The locally overpowered fuel rod has small portions where the power evacuated exceeds the average power of the rod. If the deposited CRUD has the maturity conditions, (higher density for a given composition), the local temperature of the fuel rod, in such locations, can exceed the safe operating limits, leading to fuel failure.

This also negatively impacts the economics of the operation of the power plant.

Analysis of the deposit in such locations, usually also uncovers small regions where the CRUD deposition has reconfigured itself to evacuate more power than the design limits. This reconfiguration is identifiable during warranty post failure CRUD analysis. Facility operators, therefore, strive to identify underpowered core situations and quickly remedy these conditions.

In order to prevent infringement of operating safety and performance margins operators initiate safeguards, both physical and procedural, to ensure safe operation of the plant. Among the physical safeguards implemented, for example in a boiling water reactor, local power monitors are placed within the core to measure the amount of power being generated at specified positions in the core. These measurements provide operators with a snapshot of the core at these measurement locations. In-core monitors, however, are not placed in all locations of the core as it is impractical to install measuring equipment in all locations of a reactor core. Areas of the core, consequently, go unmonitored without sacrificing safety of operation. After core operation, assumptions are then made as to the amount of useful life remaining for each of these non-measured assemblies. Placement of these non-measured assemblies back into the core involves conservative assumptions for the remaining life of the assembly. Because conservative assumptions are made, nuclear fuel may be discharged from the core as supposedly "depleted", when, in fact, there is sufficient fuel left in the fuel assembly for further operation. Operating the core in an inefficient manner can negatively impact the economic aspects of the nuclear facility.

Fuel assemblies change nuclear reactivity during core exposure time, thereby complicating the identification of the remaining life of each fuel assembly. Unidentified materials, known as CRUD, can coat or be deposited on the outside of fuel rods and assemblies. All are affecting the heat transfer capability of the reactor components. Deposits can also form on other heat transfer surfaces, such as steam generator tubing. As the deposit layer thickness increases, an insulating effect occurs for the nuclear component, for example, hindering heat transfer and power output of the core.

CRUD can significantly affect the remaining life of each fuel assembly in the core. In reactor operation, however, CRUD deposits differ at each location in the reactor. The differing amounts/thicknesses of CRUD deposits, therefore, hinder reactor engineers in determining the amount of useful life left in a nuclear fuel assembly because some fuel assemblies have a significant amount of insulating CRUD while other fuel assemblies do not.

There is therefore a need to provide a method to determine the power transfer characteristics of a nuclear fuel assembly which has accumulated CRUD deposits on nuclear fuel rods.

There is furthermore a need to provide a method to determine the power transfer characteristics of fuel assemblies that have a core residence time, but however were not physically monitored during core exposure.

There is also a need to provide a method that will determine the power transfer characteristics of core components, such as steam generators, that have an accumulated deposits on their tubing surface.

SUMMARY

It is therefore an objective of the present invention to provide a method to determine the power transfer characteristics of a nuclear component, which has accumulated deposits on its surface. More specifically it is an objective of the present invention to provide a method to determine the power transfer characteristic of a nuclear reactor fuel assembly which has accumulated CRUD deposits on the nuclear fuel rods.

It is also an objective of the present invention to provide a method to determine the power characteristics of fuel assemblies that have a core residence time, but however were not physically directly monitored during core exposure.

The objectives of the present invention are achieved as illustrated and described. The present invention provides a method to characterize the power transfer characteristics of a heating component. The method includes the steps of obtaining a sample of a deposit layer on a side of a nuclear heating component, obtaining a scanning electron microscope image of a surface of the sample, i.e., the surface of the sample in contact with the heating component, obtaining a scanning electron microscope image of another surface of the sample, i.e., the surface of the sample in contact with the fluid, analyzing the scanning electron microscope images of the surface and the another surface of the sample for the presence of capillaries and steam chimneys, determining a number of capillaries and steam chimneys of both surfaces and the surface of the sample, and calculating the power transfer of the heating component based on a number of steam chimneys in the deposit layer.

The method can also be performed such that the step of analyzing the scanning electron microscope images of the outside and the inside surfaces of the sample for the presence of capillaries and steam chimneys includes determining a total number of openings on the inside surface and the outside surface of the sample, creating a graph of relative sizes of the openings, determining a threshold point on the graph between capillaries and steam chimneys, calculating a number of capillaries on the graph based on the threshold point and calculating a number of steam chimneys on the graph based on the threshold point.

The method can also be accomplished such that the step of obtaining a sample of a deposit layer on the side of the nuclear heating components, for example a fuel element, includes scraping a side of the heating component, for example a nuclear fuel element, to obtain a flake.

The method may also be accomplished such that the step of determining the threshold point on the graph between capillaries and steam chimneys is based on a size of a vapor bubble. The method may also be accomplished such that the step of calculating the number of capillaries on the graph based on threshold point comprises identifying a number of capillaries per unit of area. Additionally, the step of calculating the number of steam chimneys based on the threshold point may comprise the step of identifying a number of steam chimneys per unit of area.

The method may additionally be accomplished such that the step of obtaining a sample of a deposit layer on the side of the component includes scraping the side of the component to obtain a flake additionally comprises identifying an inner surface of the flake and an outer surface of the flake. The size of the steam capillaries and/or steam chimneys can be determined by the average size of a vapor bubble in the cooling fluid. The method can be equally applicable to fuel rods, steam generator tubes, and other apparatus from boiling water reactors and pressurized water reactors.

BRIEF DESCRIPTION OF THE DRAWINGS

FIG. 1 is a graph of steam chimney and steam capillary distribution in an exemplary sample flake.

DETAILED DESCRIPTION

The present invention provides for analysis of Light Water Reactor (LWR) fuel elements which have been exposed to reactor operating conditions. LWR fuel elements that have been exposed to a reactor and reactor operating conditions may undergo deposition of material from dissolved elements present in reactor coolant. The dissolved elements, such as iron and minerals, plate onto the exterior surface of fuel rods and form a crusted coating. The coating is non-homogeneous and various holes, defined as capillaries (small to nonexistent holes in the exterior surface) and steam chimneys (larger, more well defined holes in the exterior surface) are present throughout the coating. Capillaries transport water to the steam chimneys, where it is evaporated, cooling the fuel rod surface.

Analysis of light water reactor flake capillary and steam chimney configurations and conditions is also essential to the understanding of LWR fuel element heat transfer and fuel element failures particularly for BWR fuel elements. Visual processing of CRUD flake images, however, can be prohibitively labor intensive, subjective and error prone.

By using image processing tools and mathematical algorithms, however, evaluation of the capillaries and steam chimneys (as well as the associated capability to calculate heat transfer characteristics of the encrusted fuel rod), is simplified. The present invention provides a method, which can be performed on a computer, for example, to provide a consistent and more detailed analysis of the density of capillaries and steam chimneys present in fuel rods. The present invention, therefore, provides a detailed accounting of the densities and populations of capillaries and steam chimneys.

With the associated method of the present invention, the understanding of LWR crud heat transfer mechanisms is refined to a degree never previously achieved. Additionally, through the present invention, a correlation is achieved between localized neutron flux and heat produced/extracted from fuel at the same location through the deposited CRUD layer.

The method entails specific steps herein described. The first step in the methodology is to obtain images of both an interior facing surface of a sample flake and an exterior facing surface of the same sample flake. The sample flake is removed from a surface, for example, of a nuclear fuel rod. The resulting images obtained from the sample flake can be obtained, for example, from a scanning electron microscope. The scanning electron microscope images can be digital images saved in a computer memory, for example. A scale factor is then input by the user for each of the image files obtained for analysis so that approximate sizes of the features of the flake may be calculated. The user manually enters the scale value from which the images were obtained. The user may then manually determines the start and end pixel locations for the scale bar chosen.

The scale value chosen by the user is divided by the pixel length of the bar to determine a pixel scaling factor for the image in question. The digital image to be evaluated is then cropped of any information which is not required to be evaluated. Information such as text, unclear edges, etc. is eliminated from the image. The usable area of the individual photograph is then equalized to normalize the pixel values to prevent discontinuities.

All pixels illumination values, for example, below a user defined threshold value (for example a value of 20), are set to 0 to provide a baseline for evaluation. Then the digital image is inverted by making these pixels previously set to 0, set to an exemplary value of 255. The next step in the method entails selecting pixels with a value of 255, for example, and designating these pixels as surface holes. A connected group is then defined by the user (i.e. the pixels with values of 255 which are connected or positioned next to one another). The extent of the connected group depends upon the values obtained from the digital image and the defects inherent in the surface under evaluation. The connected group is then assigned a unique value or designator for the connected group. The numbering or designation designates each region of interest for subsequent processing steps. The connected components are superimposed on a copy of the original image to allow the user to check the results obtained and to determine if there are not more or less holes in the surface than originally provided in the surface of the material under study. The pixels are then counted for each connected component to determine the pixel area for each surface hole. The pixel areas for each surface hole are multiplied by the scaling factor (squared) to convert the pixel area to a unit of square measurement, thus allowing a total calculation of surface area for each defect in the surface. In the exemplary embodiment provided, the area is provided in square millimeters. The surface hole areas are sorted to order the areas of defects from high surface area values to low surface area values. The sorted area information is displayed graphically and in tabular format for review. A threshold value is determined either automatically or manually for separation of steam chimneys from capillaries. From experimental experience, the threshold value may be set for example to 3 µm$^2$.

outer surface images from each flake. Averaging combines numbers for inner and outer surfaces. The number of capillaries is between one to two orders of magnitude larger than the number of steam chimneys. In the exemplary embodiment provided, Flake A has a very low number of capillaries, illustrating clogging and the subsequent fluid starving of the CRUD as a pre-request for steam blanketing of the rod. None of the other flakes in the exemplary embodiment show such a small number of capillaries from analysis.

The average diameter of steam chimneys is 2.76-3.02 µm and that of capillaries is 0.41-0.79 µm. Note that flake A has the largest average capillary diameter which in fact shows that only the largest capillaries are not yet clogged.

TABLE 1

Chimney and Capillary Population of Crud at a BWR Plant

| | | Flake | | | | | |
|---|---|---|---|---|---|---|---|
| | Units | A | B | C | D | #15 | #13 |
| Average Chimney Population | 1/mm$^2$ | 4023 | 4448 | 4640 | 3662 | 4168 | 5611 |
| Average Chimney Diameter | 10$^{-3}$ mm | 3.01 | 2.76 | 3.02 | 2.58 | 2.83 | 2.85 |
| Average Capillary Population | 1/mm$^2$ | 64227 | 172755 | 161700 | 184920 | 234166 | 211173 |
| Average Capillary Diameter | 10$^{-3}$ mm | 0.79 | 0.41 | 0.38 | 0.51 | 0.66 | 0.55 |
| Maximum Measured Power (per Cycle) | W/cm$^2$ | 106 | 103 | 99 | 99 | 103 | 104 |
| Average Measured Power (per 6 month) | W/cm$^2$ | 100 | 95 | 94 | 91 | 96 | 95 |
| Calculated Power 6 Month (from Crud Characteristics) | W/cm$^2$ | 111 | 127 | 134 | 95 | 116 | 182 |

Through digital processing, the system, for example a computer, counts the number of steam chimneys above the threshold value and sums the combined area of the chimneys. The steam chimney count is used to determine the density of steam chimneys in the subject image. The selection of a threshold surface is performed on the basis of the information received from digital processing. For example, in FIG. 1, it is seen that every diameter above 1.5 µm belongs to a steam chimney. Through experimental runs, it has been determined that there is a precipitous change in the number of counted circular areas at the OD surface of the CRUD when those areas change from capillaries to steam chimneys. The diameter of capillaries is much smaller which makes them much more numerous on any given surface.

Every circular surface above the minimum surface obtained with the threshold diameter is counted as a steam chimney. The rest of the circular areas with a smaller diameter are considered capillaries. Based on surface scaling, the steam chimney density for each sample is then calculated (#/mm$^2$).

The method then entails counting the number of hole areas counted below the steam chimney threshold value as capillaries and subsequently determines the capillaries densities per square area.

The ratio between the densities of capillaries and steam chimneys are analyzed as an indication of how well the steam chimneys were fed by the capillaries in a given region of the CRUD. Exemplary values of analysis are provided in Table 1. Table 1 provides an example of results of the determination of the number of chimneys and capillaries and their average diameters obtained from looking at a number of inner and The rod power is supplied as kW/ft and is known from original power reactivity provided by the manufacturer. To convert to a heat flux in W/cm$^2$, the power is divided by the area of the rod surface in one linear foot. The rod powers were calculated with both maximum and for the initial 6 month averages as obtained from the neutron flux measurements from in-core detectors as an example. Location of in-core detectors allow for only average flux measurements over a given core volume however, the actual power level supported by CRUD at a given location can be substantially different than the power indication given through the in-core detectors.

Additional calculations of the power level supported by the steam chimney density are also conducted based upon the amount of openings provided from the surface evaluation. As an example, average values for heat transfer through non-defect areas may be assumed. Values of heat/power dissipation for areas with defects may also be determined on the basis of the surface area and whether the boiling deposit surface area is properly fed or is starved. If a steam chimney is calculated as being starved, then a lesser amount of heat/power dissipation occurs at the chimney as there is no clear path for heat/power dissipation. If the steam chimney does have proper feeding capabilities, the steam chimney area can be considered to be open with heat/power freely flowing through the opening. As an additional optional part of the method, a subroutine may calculate heat flux that would be supported by the actual measured count of steam chimneys using a relationship between the population of steam chimneys and the local heat flux. The heat flux value is then compared with the measured available power produced locally according to, for example, in-core neutron detector measurements. The relationship between the number of steam chimneys existing at any given place in a deposit, such as with CRUD, and the localized heat flux is a relationship between nucleate boiling sites on a clean surface and the heat flux:

$$N_v = a x (q_0)^b \quad (1)$$

where:

$N_v$ is the number of nucleate boiling sites (or steam chimneys) per $mm^2$;

a and b are two constants and $q_0$ is the heat flux in Watts/$cm^2$.

As provided in Table 1, the calculated power using the actual number of steam chimneys existing in each flake is different from the power obtained from the neutron detectors measured available value. The calculated power was labeled in Table 1 as "Calculated Power 6 Month" to designate that the table calculations considered 6 months as the maximum time frame needed to form the fully developed CRUD. This power expelled through the CRUD was for five of the six crud flakes in agreement with, but slightly larger than the one recorded through the neutron flux detectors, with one exception. The single exception, Flake D indicated that the power expelled was smaller than the one maximum power recorded through the neutron flux monitors. For the sixth sample, Flake #13, which comes from a fuel rod close to a control moderator blade, the power that was potentially evacuated from the existing steam chimneys at 35 inches (approximately 89 cm) from the bottom of the pin is almost double the maximum recorded power as computed from the neutron flux detectors indication corresponding to that pin at that specific position.

The methodology may then provide the final image of the examined inner or outer surface of the CRUD flake along with a summary of the steam chimney and capillary information as well as power output information.

The present invention provides many advantages over evaluation methods previously used. The present invention provides for an objective, cost effective, accurate methodology for measuring the number of steam capillaries and steam chimneys in a deposit layer atop a nuclear fuel rod. Previous to the present invention, there was no known method to calculate the heat evacuation capability of a crudded nuclear fuel rod at a specific location and to relate this to the heat evacuation capability of the nuclear fuel rod and surrounding volume based on characteristics of deposition.

Additionally, the present invention provides a methodology which verifies the data obtained through neutron detectors during core operation.

In foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method to characterize a power transfer of a heating surface of a component with a layer of material placed on a side of the component, comprising;

obtaining a sample of a deposit layer on the side of the heating component;

obtaining a scanning electron microscope image of a surface of the sample;

obtaining a scanning electron microscope image of another surface of the sample;

analyzing the scanning electron microscope images of the surface and the another surface of the sample for a presence of capillaries and steam chimneys;

determining a number of capillaries and steam chimneys for the surface and the another surface;

determining a diameter of capillaries and steam chimneys for the surface and the another surface; and calculating the power transfer of the heating component based on the number of steam chimneys in the deposit layer.

2. The method according to claim 1, wherein the step of obtaining a sample of the deposit layer includes scraping a side of the component to obtain a flake.

3. The method according to claim 1, wherein the step of determining the number of capillaries and steam chimneys for the surface and the another surface further comprises preparing a graph of a number of openings on the surface and the another surface; and establishing a threshold point on the graph separating a number of capillaries from a number of steam chimneys, based on a comparison of a diameter versus number representation for each of the examined surfaces.

4. The method according to claim 3, wherein the threshold point on the graph of capillary and steam chimney diameters verses number is based on a size of a vapor bubble.

5. The method according to claim 3, wherein the step of determining the number of capillaries and steam chimneys for the surface and the another surface is performed such that the number of steam chimneys and the capillaries is performed on a per unit of area basis.

6. The method according to claim 4, wherein the step of obtaining a sample of a deposit layer on the side of the component includes identifying an inner surface of the flake and an outer surface of the flake.

7. The method according to claim 1, wherein the step of calculating the power transfer of the component based on a number of steam chimneys in the deposit layer is performed by an equation $N_v = a\, x (q_0)^b$.

8. The method according to claim 1, wherein the heating surface of the component is a fuel rod of a light water reactor.

9. The method according to claim 8, wherein the fuel rod is from one of a boiling water reactor and a pressurized water reactor.

10. The method according to claim 1, wherein the layer of material placed upon the side of the component is Chalk River Unidentified Deposits (CRUD).

11. The method according to claim 1, wherein the deposit layer of material obtained from one of solids and dissolved substances in a cooling fluid is placed upon the heating surface.

12. The method according to claim 1, wherein the step of calculating the power transfer of the component is based on the number of steam chimneys in the deposit layer calculates the average power transfer for a given time interval.

13. The method according to claim 1, wherein the step of calculating the power transfer of the component is based on the number of steam chimneys in the deposit layer further calculates an average power transfer of the component for a nuclear fuel cycle.

14. The method according to claim 1, further comprising:

comparing local power density readings from in-core monitors to the calculated power transfer after the step of calculating the power transfer of the fuel element based on the number of steam chimneys in the deposit layer.

15. A method to characterize a power transfer of a heating surface of a component with a layer of deposit material placed on a surface of the component obtained from one of solids and dissolved substances in a cooling fluid, comprising;

obtaining a sample of a deposit layer on a side of the component;

obtaining an image of at least two surfaces of the sample;

analyzing the digital images of the outside and inside surfaces of the sample for a presence of capillaries and steam chimneys;

determining a number of capillaries and steam chimneys for the surfaces;

determining a diameter of the capillaries and the steam chimneys for the surfaces; and calculating the power transfer of the component based on the number of steam chimneys in the deposit layer.

16. The method according to claim 15, wherein the step of obtaining a sample of the deposit layer on the side of the component includes scraping a side of the heating surface to obtain a flake.

17. The method according to claim 15, wherein the step of determining the number of capillaries and steam chimneys for the outside surface and the inside surface further comprises preparing a graph of a number of openings on the inside surface and the outside surface; and establishing a threshold point on the graph separating a number of capillaries from a number of steam chimneys, based on a comparison of a diameter versus number representation for each of the examined surfaces.

18. The method according to claim 17, wherein the step of determining the threshold point on the graph between capillaries and steam chimneys is based on a size of a vapor bubble.

* * * * *